United States Patent
Cai et al.

(10) Patent No.: US 11,539,478 B2
(45) Date of Patent: Dec. 27, 2022

(54) COMMUNICATION METHOD AND COMMUNICATION CLIENT DEVICE FOR RADIO LINK FAILURE

(71) Applicant: HUAWEI TECHNOLOGIES CO., LTD., Guangdong (CN)

(72) Inventors: Tao Cai, Kista (SE); Henrik Lundqvist, Kista (SE); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 16/905,322

(22) Filed: Jun. 18, 2020

(65) Prior Publication Data

US 2020/0322093 A1 Oct. 8, 2020

Related U.S. Application Data

(63) Continuation of application No. PCT/EP2017/083660, filed on Dec. 19, 2017.

(51) Int. Cl.
*H04L 1/18* (2006.01)
*H04W 24/04* (2009.01)

(52) U.S. Cl.
CPC .......... *H04L 1/188* (2013.01); *H04W 24/04* (2013.01)

(58) Field of Classification Search
CPC ...................................... H04L 1/188
See application file for complete search history.

(56) References Cited

U.S. PATENT DOCUMENTS

| 9,549,358 | B1* | 1/2017 | Ho | H04B 17/318 |
| 2002/0150048 | A1 | 10/2002 | Ha et al. | |
| 2011/0080825 | A1* | 4/2011 | Dimou | H04W 36/305 370/332 |

(Continued)

FOREIGN PATENT DOCUMENTS

| CN | 101159520 A | 4/2008 |
| CN | 104113928 A | 10/2014 |
| WO | 2010060108 A2 | 5/2010 |

(Continued)

OTHER PUBLICATIONS

3GPP TS 36.331 V12.4.1 (Dec. 2014), "3rd Generation Partnership Project; Technical Specification Group Radio Access Network; Evolved Universal Terrestrial Radio Access (E-UTRA); Radio Resource Control (RRC); Protocol specification (Release 12)," Dec. 2014, 408 pages.

(Continued)

*Primary Examiner* — Edan Orgad
*Assistant Examiner* — Won Tae C Kim
(74) *Attorney, Agent, or Firm* — Fish & Richardson P.C.

(57) ABSTRACT

This application provides a client device, a method, and a computer program. The client device obtains a first parameter associated with a radio link failure timer. The first parameter indicates a first time period during which the radio link failure timer is reset and thereafter started. The client device further obtains a second parameter associated with the radio link failure timer. The second parameter indicates a second time period during which the radio link failure timer is started and thereafter reset. Based on the first parameter and the second parameter, the client device determines a value of the radio link failure timer.

15 Claims, 4 Drawing Sheets

(56) References Cited

U.S. PATENT DOCUMENTS

2014/0128058 A1* 5/2014 Ji .................... H04W 24/04
                                                    455/423
2015/0087317 A1* 3/2015 Yiu .................... G06F 9/4856
                                                    455/441

FOREIGN PATENT DOCUMENTS

WO    2014066359 A1    5/2014
WO    2016140599 A1    9/2016

OTHER PUBLICATIONS

Ericsson, "Radio link monitoring," 3GPP TSG-RAN WG1 NR Ad Hoc #3, R1-1716157, Nagoya, Japan, Sep. 18-21, 2017, 6 pages.
PCT International Search Report and Written Opinion issued in International Application No. PCT/EP2017/083660 dated Jul. 24, 2018, 13 pages.
NextNav, Broadcom, "Addition UE Reset for MBS," 3GPP TSG-RAN WG5 Meeting #73, R5-168155, Reno, USA, Nov. 14-18, 2016, 6 pages.
Office Action issued in Chinese Application No. 201780094953 dated May 20, 2021, 6 pages (with English translation).
Xiang, "Resource Allocation and Networking Techniques for Next Generation Wireless Multi-Hop Relay Networks," Southwest Jiaotong University, Doctoral Degree Dissertation, Jun. 2011, 101 pages (with English abstract).
Office Action issued in Chinese Application No. 201780094953.0 dated Oct. 16, 2020, 17 pages (with English translation).

* cited by examiner

COMMUNICATION METHOD AND COMMUNICATION CLIENT DEVICE FOR RADIO LINK FAILURE

CROSS REFERENCE TO RELATED APPLICATION

This application is a continuation of International Application No. PCT/EP2017/083660, filed on Dec. 19, 2017. The aforementioned application is hereby incorporated by reference in its entirety.

TECHNICAL FIELD

The invention relates to a client device. Furthermore, the invention also relates to corresponding methods and a computer program.

BACKGROUND

In the context of next generation (5G) wireless networks, both low frequency radio and high frequency radio are considered to be used for the purpose of establishing radio links between network nodes and user nodes within a wireless access network. Within 3GPP standardization for 5G, low frequency (LF) and high frequency (HF) are defined as the frequencies below and above 6 GHz, respectively. HF band can be around 30 GHz or 60 GHz, and LF band can be around 3 GHz or 4 GHz. For HF radio multiple antennas and beamforming will be needed to combat the higher path loss at such high radio frequencies.

There are two special aspects of HF radio related to antenna design that needs to be considered. One is that an HF antenna captures less signal energy than an LF antenna, and the other that an HF antenna captures more noise power than an LF antenna. The former is due to higher frequency and smaller antenna aperture, and the latter is due to normally wider HF radio channel bandwidth. Hence, HF radio suffers from lower signal-to-noise ratio than LF radio. However, the lower signal-to-noise ratio can be compensated by higher antenna gains with higher antenna directionality. Due to its smaller wavelength, the antenna size is typically smaller for HF radio than in LF applications. The transmitter and receiver of HF radio can therefore accommodate more antenna elements. With a larger number of antenna elements narrower beams can be produced which will yield higher antenna gains. The beam can be formed through a phase control system such that the direction, as well as the beam width can be adjusted. Narrower beam is beneficial for providing higher antenna gains, causing less multi-path fading as well as minimizing cross link interference.

The large available bandwidth and the high antenna gain available with HF radio makes HF radio links suitable to provide very high data throughput between network access nodes and user nodes. However, the high directivity of narrow beam makes the HF radio link fragile as the alignment of beams between the transmitter and receiver can easily be lost, e.g. due to the movement and/or rotation of the user node. Furthermore, the HF radio link can be blocked by obstacles such as buildings and vehicles between the transmitter and the receiver, due to the high penetration loss and lack of diffraction of HF radio links.

In wireless networks, the radio link quality is constantly monitored through radio link measurement on certain reference signals, pilot signals or synchronization signals. According to 3GPP LTE, so called "out of sync" (OOS) is indicated by physical layer (PHY) if the PHY measurement value is below a threshold value, while so called "in sync" (IS) is indicated if the PHY measurement value is above the threshold value. When the medium access layer (MAC) receives a certain number of consecutive OOS indications, it starts a timer. If MAC does not receive a certain number of consecutive IS indications from PHY before the timer expires, MAC will announce it has detected a radio link failure (RLF) to a higher layer. After the RLF is detected, the user node initiates a radio link re-establishment operation to connect to another best available cell.

The radio link re-establishment will be based on random access operation to the best available cell through physical random access channel (PRACH) where the user node will try retransmission on the PRACH if no response is received from any cells and may apply power ramping. If all PRACH attempts on the same carrier frequency fail, the user node will try to connect to another carrier frequency or radio access technology (RAT).

The radio link re-establishment procedure is time consuming and may not be optimal for radio link recovery of HF narrow beams. In LF radio scenarios, the radio link quality degradation leading to a RLF is typically caused by large path loss and shadow fading. Performing a radio link re-establishment procedure to re-connect to another cell is suitable to solve such link quality degradations. For HF radio links on the other hand, a radio link quality degradation can be caused by temporary blockage, such as e.g. a moving vehicle. In such situations, it may not be optimal to declare a RLF and trigger the time and resource consuming radio link re-establishment procedure.

SUMMARY

An objective of embodiments of the invention is to provide a solution which mitigates or solves the drawbacks and problems of conventional solutions.

The above and further objectives are solved by the subject matter of the independent claims. Further advantageous embodiments of the present invention can be found in the dependent claims.

According to a first aspect of the invention, the above mentioned and other objectives are achieved with a client device for a wireless communication system, the client device being configured to
  obtain a first parameter associated with a radio link failure timer, wherein the first parameter indicates a first time period during which the radio link failure timer is reset and thereafter started;
  obtain a second parameter associated with the radio link failure timer, wherein the second parameter indicates a second time period during which the radio link failure timer is started and thereafter reset;
  determine a value of the radio link failure timer based on the first parameter and the second parameter.

That the radio link failure timer is reset can in this disclosure be understood to mean that the radio link failure timer is stopped, and no information is stored about the remaining time of the radio link failure timer. Hence, when the radio link failure timer is started again the radio link failure timer will start from the value of the radio link failure timer and count down towards zero. The radio link failure timer could also be implemented to instead start from zero and count up towards the value of the radio link failure timer. Once the timer reaches the value of the radio link failure timer, the radio link failure is declared.

An advantage of the client device according to the first aspect is that the radio link failure timer can be updated dynamically based on actual radio link property that a client device has experienced. Thereby, declaration of radio link failure for short term variation of the radio link quality can be postponed. On the other hand, if the client device is located in a location with long term unfavourable radio conditions, the declaration of radio link failure can be relatively advanced.

In an implementation form of a client device according to the first aspect, the client device is further configured to
determine the value of the radio link failure timer based on a difference between the first parameter and the second parameter.

An advantage with this implementation form is that it can enable a simple low complex implementation, e.g. where no floating point operation will be necessary.

In an implementation form of a client device according to the first aspect, the client device is further configured to determine the value of the radio link failure timer based on a ratio of the first parameter and the second parameter.

An advantage with this implementation form is that it can enable a simple low complex implementation.

In an implementation form of a client device according to the first aspect, the ratio is the first parameter over the second parameter.

An advantage with this implementation form is that the values of the ratio will be large, since usually the time periods between the radio link failure timer reset and start is in most cases longer than the time periods between the radio link failure start and reset. This will avoid problems with truncation which will be a problem for very small values.

In an implementation form of a client device according to the first aspect, the client device is further configured to
update the first parameter when the radio link failure timer is started so as to obtain an updated first parameter;
determine the value of the radio link failure timer based on an updated ratio of the updated first parameter and the second parameter.

An advantage with this implementation form is that it enables the value of the radio link failure timer to be updated every time the radio link failure timer is started.

In an implementation form of a client device according to the first aspect, the client device is further configured to
update the second parameter when the radio link failure timer is reset so as to obtain an updated second parameter;
determine the value of the radio link failure timer based on an updated ratio of the first parameter and the updated second parameter.

An advantage with this implementation form is that it enables the value of the radio link failure timer to be updated every time the radio link failure timer is reset.

In an implementation form of a client device according to the first aspect, the client device is further configured to
update the first parameter when the radio link failure timer is started so as to obtain an updated first parameter;
update the second parameter when the radio link failure timer is reset so as to obtain an updated second parameter;
determine the value of the radio link failure timer based on an updated ratio of the first updated parameter and the second updated parameter.

An advantage with this implementation form is that it enables the value of the radio link failure timer to be updated every time the radio link failure timer is started or reset.

In an implementation form of a client device according to the first aspect, the client device is further configured to
increase the value of the radio link failure timer with a first amount if the updated ratio is larger than the ratio;
decrease the value of the radio link failure timer with a second amount if the updated ratio is smaller than the ratio.

An advantage with this implementation form is that it enables the declaration of radio link failure for short term variation of the radio link quality can be postponed. Further, if the client device is located in a location with long term unfavourable radio conditions, the declaration of radio link failure can be relatively advanced.

In an implementation form of a client device according to the first aspect, the client device is further configured to
increase the value of the radio link failure timer with the first amount if the updated ratio is larger than the ratio and a first threshold value;
decrease the value of the radio link failure timer with the first amount if the updated ratio is smaller than the ratio and a second threshold value.

An advantage with this implementation form is that it enables the declaration of radio link failure for short term variation of the radio link quality can be postponed. Further, if the client device is located in a location with long term unfavourable radio conditions, the declaration of radio link failure can be relatively advanced. The using of threshold values also minimizes unnecessary operations due to relatively small variation of the ratio.

In an implementation form of a client device according to the first aspect, the client device is further configured to
increase the value of the radio link failure timer with the first amount which equals to a first step value;
decrease the value of the radio link failure timer with the second amount which equals to a second step value.

An advantage with this implementation form is that it enables a controlled behaviour of the client device, which can be specified in a standardized manner. It further enables to have different behaviour when increasing the value of the radio link failure timer compared to when decreasing the value of the radio link failure timer, which can increase stability in the regulation of the value of the radio link failure timer.

In an implementation form of a client device according to the first aspect, the client device is further configured to
receive a first control message from a network access node serving the client device, wherein the first control message indicates the first step value and the second step value.

An advantage with this implementation form is that it enables the network access node to determine the process and thereby control the client device internal process and behaviour.

In an implementation form of a client device according to the first aspect, the client device is further configured to
generate a second control message indicating the value of the radio link failure timer;
transmit the second control message to a network access node serving the client device.

An advantage with this implementation form is that it enables the client device to inform the network access node about the current value of the value of radio link failure timer. A benefit of this is that the network could take that information into account when assigning radio resources to the client device. Another benefit is that it could increase the knowledge of the network access node about the radio environment in the area where the network access node provides service, such as coverage holes or locations with large variation in signal quality.

In an implementation form of a client device according to the first aspect, the client device is further configured to
   determine a spatial location associated with the value of the radio link failure timer;
   generate the second control message further indicating the spatial location.

An advantage with this implementation form is that it enables the network access node to further associate the radio environment with a physical location, which can be taken into account when assigning radio resources to client devices at the reported location to increase the performance for the client devices served by the network access node.

In an implementation form of a client device according to the first aspect, the client device is further configured to
   declare a radio link failure if the radio link failure timer expires.

To declare a radio link failure can in this disclosure be understood to be an internal procedure within the client device.

An advantage with this implementation form is that the client device can determine which procedure to invoke to solve a radio link problem.

According to a second aspect of the invention, the above mentioned and other objectives are achieved with a network access node for a wireless communication system, the network access node being configured to
   receive a second control message from a client device served by the network access node, wherein the second control message indicates a value of a radio link failure timer of the client device.

An advantage of the network access node according to the second aspect is that it enables the client device to inform the network access node about the current value of the value of radio link failure timer. A benefit of this is that the network could take that information into account when assigning radio resources to the client device. Another benefit is that it could increase the knowledge of the network access node about the radio environment in the area where the network access node provides service, such as coverage holes or locations with large variation in signal quality. The network access node may use statistics calculated from the reported values from client devices to determine which value it shall provide to other client devices, for example in a connection setup procedure.

In an implementation form of a network access node according to the second aspect, the network access node is further configured to
   determine a first step value and a second step value associated with the radio link failure timer;
   generate a first control message indicating the first step value and the second step value;
   transmit the first control message to the client device.

An advantage with this implementation form is that it enables the network access node to determine the process and thereby control the client device internal process and behaviour.

According to a third aspect of the invention, the above mentioned and other objectives are achieved with a method for a client device, the method comprises
   obtaining a first parameter associated with a radio link failure timer, wherein the first parameter indicates a first time period during which the radio link failure timer is reset and thereafter started;
   obtaining a second parameter associated with the radio link failure timer, wherein the second parameter indi-
   cates a second time period during which the radio link failure timer is started and thereafter reset;
   determining a value of the radio link failure timer based on the first parameter and the second parameter.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the invention, the above mentioned and other objectives are achieved with a method for a network access node, the method comprises
   receiving a second control message from a client device served by the network access node, wherein the second control message indicates a value of a radio link failure timer of the client device.

The method according to the fourth aspect can be extended into implementation forms corresponding to the implementation forms of the network access node according to the second aspect. Hence, an implementation form of the method comprises the feature(s) of the corresponding implementation form of the network access node.

The advantages of the methods according to the fourth aspect are the same as those for the corresponding implementation forms of the network access node according to the second aspect.

The invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprised of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
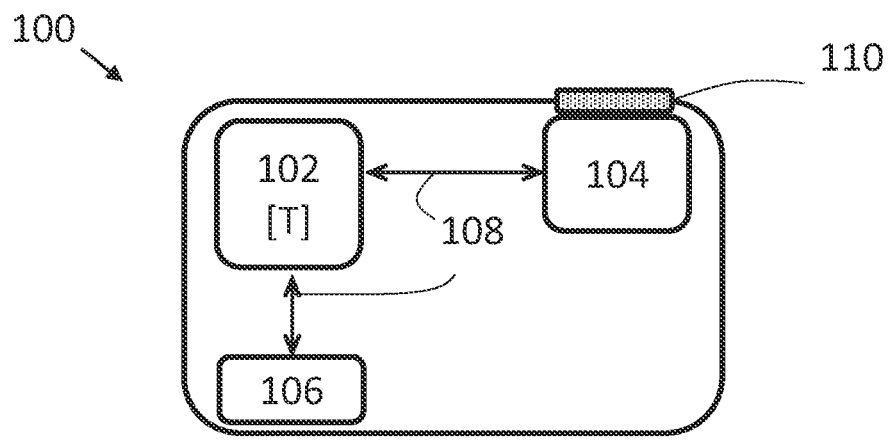
FIG. 1 shows a client device according to an embodiment of the invention.

FIG. 1 shows a client device 100 according to an embodiment of the invention. In the embodiment shown in FIG. 1, the client device 100 comprises at least one processor core 102, a transceiver 104 and a memory 106. The processor core 102 is coupled to the transceiver 104 and the memory 106 by communication means 108 known in the art. The memory 106 may store program code that, when being executed, causes the processor core(s) 102 of the client device 100 to perform the functions and actions described herein. The client device 100 further comprises an antenna 110 coupled to the transceiver 104, which means that the client device 100 is configured for wireless communications in a wireless communication system.

That the client device 100 is configured to perform certain functions or actions can in this disclosure be understood to mean that the client device 100 comprises suitable means, such as e.g. the processor core 102, configured to perform said functions or actions.

The client device 100 in FIG. 1 is configured to obtain a first parameter P1 (shown in FIG. 5) associated with a radio link failure timer T. The first parameter P1 indicates a first time period during which the radio link failure timer T is reset and thereafter started. The radio link failure timer T may e.g. be a T310 timer, such as the T310 timer defined in the 3GPP LTE standard. The client device 100 is further configured to obtain a second parameter P2 (also shown in FIG. 5) associated with the radio link failure timer T. The second parameter P2 indicates a second time period during which the radio link failure timer T is started and thereafter reset. Furthermore, the client device 100 is configured to determine a value of the radio link failure timer T based on the first parameter P and the second parameter P2.

Figure 2:
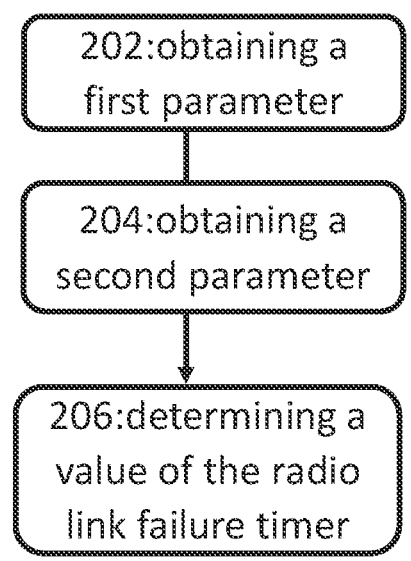
FIG. 2 shows a method according to an embodiment of the invention.

FIG. 2 shows a flow chart of a corresponding method 200 which may be executed in a client device 100, such as the one shown in FIG. 1. The method 200 comprises obtaining 202 a first parameter P1 associated with a radio link failure timer T. The first parameter P1 indicates a first time period during which the radio link failure timer T is reset and thereafter started. The method 200 further comprises obtaining 204 a second parameter P2 associated with the radio link failure timer T. The second parameter P2 indicates a second time period during which the radio link failure timer T is started and thereafter reset. Furthermore, the method 200 comprises determining 206 a value of the radio link failure timer T based on the first parameter P1 and the second parameter P2.

Figure 3:
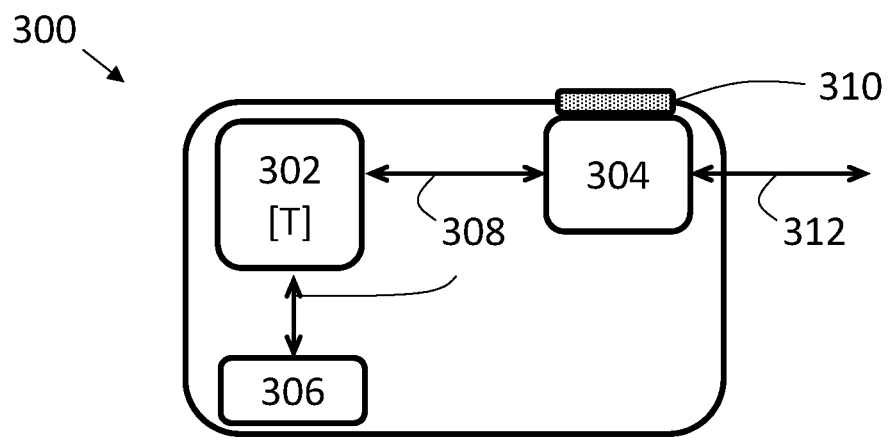
FIG. 3 shows a network access node according to an embodiment of the invention.

FIG. 3 shows a network access node 300 according to an embodiment of the invention. In the embodiment shown in FIG. 3, the network access node 300 comprises at least one processor core 302, a transceiver 304 and a memory 306. The processor core 302 is coupled to the transceiver 304 and the memory 306 by communication means 308 known in the art. The memory 306 may store program code that, when being executed, causes the processor core(s) 302 of the network access node 300 to perform the functions and actions described herein. The network access node 300 may be configured for both wireless and wired communications in wireless and wired communication systems, respectively. The wireless communication capability is provided with an antenna 310 coupled to the transceiver 304, while the wired communication capability is provided with a wired communication interface 312 coupled to the transceiver 304.

That the network access node 300 is configured to perform certain actions should in this disclosure be understood to mean that the network access node 300 comprises suitable means, such as e.g. the processor core 302 and the transceiver 304, configured to perform said actions.

The network access node 300 is configured to receive a second control message 504 from a client device 100 served by the network access node 300, wherein the second control message 504 indicates a value of a radio link failure timer T of the client device 100. As will be further described below with reference to FIG. 7.

Figure 4:
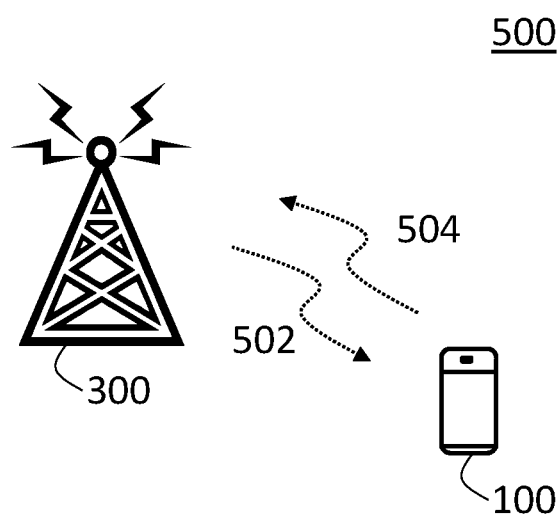
FIG. 4 shows a wireless communication system according to an embodiment of the invention.

FIG. 4 shows a wireless communication system 500 according to an embodiment of the invention. The wireless communication system 500 comprises a client device 100 and a network access node 300, both configured to operate in the wireless communication system 500. For simplicity, the wireless communication system 500 shown in FIG. 4 only comprises one client device 100 and one network access node 300. However, the wireless communication system 500 may comprise any number of client devices 100 and any number of network access nodes 300 without deviating from the scope of the invention.

In the wireless communication system 500 of FIG. 4, beamforming is used such that data is transmitted in several directions in different beams (not shown in FIG. 4) between the client device 100 and the network access node 300. The client device 100 is assumed to comprise beam management/beam failure recovery functions/procedures which will try to establish connection with the network access node 300 through one or more serving beams. If all connections to the network access node 300 are down, the client device 100 starts a radio link failure timer T. If at least one connection is established between the client device 100 and the network access nodes 300 while the radio link failure timer T is still running, the radio link failure timer T is reset. However, if no connection is established before the radio link failure timer T expires, the client device 100 declares a radio link failure upon the radio link failure timer T expiry. The declared radio link failure may trigger an initiation by the client device 100 of a radio link re-establishment procedure known in the art. However, the radio link re-establishment procedure is time consuming and should be avoided for temporary failures, due to e.g. misalignment or blockage, where another suitable beam might be found to maintain connection with the network access node 300. The probability that the client device 100 will find a suitable candidate beam and establish a connection to the network access node 300 before the radio link failure timer T expires is larger when the client device 100 experiences good radio conditions. In the embodiment shown in FIG. 4, the client device 100 is close to the network access node 300 and can be assumed to experience good radio conditions. Hence, in case of failure it is likely that the client device 100 may find a suitable candidate beam to replace a failed serving beam. To allow time for beam failure recovery functions to recover the connection to the network access node 300 it is therefore desirable to set the radio link failure timer T to a high value in this case. On the other hand, when the client device 100 is far away from the network access node 300 and therefore in bad radio conditions, there might be no other suitable candidate beams in the cell of the network access node 300. In this case, the radio link failure should be declared early to initiate radio link re-establishment on e.g. another carrier. Thus, when the client device 100 is experiencing bad radio conditions, it is desirable to set the radio link failure timer T to a low value. To optimize the radio link failure timer T to the current radio conditions experienced by the client device 100, the invention provides ways for the client device 100 to adapt a value of the radio link failure timer T. Furthermore, when the value of the radio link failure timer T has been adapted, the client device 100 may transmit a second control message 504 to the network access node 300 serving the client device 100 to inform the network access node 300 about the current value of the radio link failure timer T. In addition, the client device 100 may receive a first control message 502 from the network access node 300 comprising information which the client device 100 may use to adapt the value of the radio failure timer T.

Figure 5:
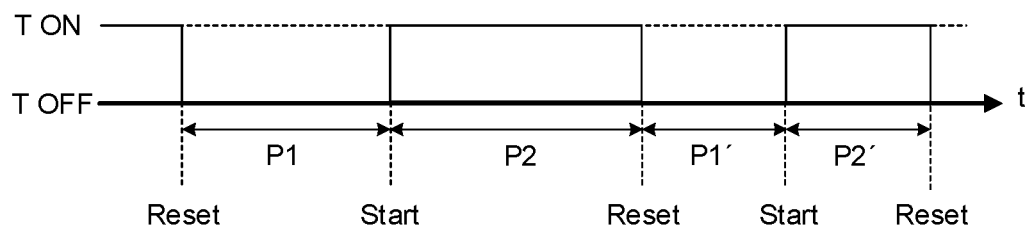
FIG. 5 shows the first parameter P1 and the second parameter P2 according to an embodiment of the invention.

According to embodiments of the invention the client device 100 is configured to determine the value of the radio link failure timer T based on a first parameter P1 and a second parameter P2. FIG. 5 shows how the first parameter P1 and the second parameter P2 are determined based on the starting and resetting of the radio link failure timer T according to an embodiment of the invention. The first parameter P1 indicates a first time period during which the radio link failure timer T is reset and thereafter started. In other words, the first parameter P1 corresponds to the time from a reset of the radio link failure timer T until the radio link failure timer T is started again, i.e. the time period during which the radio link failure timer T is not running, as shown in FIG. 5. Each time the radio link failure timer T is started a new time period during which the radio link failure T has not been running is obtained. Hence, when the radio link failure timer T is started, the first parameter P1 may be updated to obtain an updated first parameter P1', as shown in FIG. 5. The second parameter P2 indicates a second time period during which the radio link failure timer T is started and thereafter reset. In other words, the second parameter P2 corresponds to the time from the radio link failure timer T is started until the radio link failure timer T is reset, i.e. the time period during which the radio link failure T is running, as shown in FIG. 5. Each time the radio link failure timer T is reset a new time period during which the radio link failure timer T has been running is obtained. Hence, when the radio link failure timer T is reset, the second parameter P2 may be updated to obtain an updated second parameter P2', as shown in FIG. 5.

Based on the first parameter P1 and the second parameter P2 the client device 100 is configured to determine a value of the radio link failure timer T. The determined value of the radio link failure timer T may be used the next time the radio link failure timer T is started. In addition, the determined value of the radio link failure timer T may be reported to the network access node 300, as will be described below with reference to FIG. 7.

The client device 100 may determine the radio link failure timer T in a number of different ways. In embodiments, the value of the radio link failure timer T is determined based on a difference between the first parameter P1 and the second parameter P2. The difference may e.g. be a subtraction. When the difference is a ratio R of the first parameter P1 and the second parameter P2, the ratio R may e.g. be the first parameter P1 over the second parameter P2, i.e. R=P1/P2.

As described above with reference to FIG. 5, the first parameter P1 and the second parameter P2 may be updated after each start and reset of the radio link failure timer T, respectively. This results in that an updated ratio R' may be calculated each time the first parameter P1 or the second parameter P2 is updated. For example, when an updated first parameter P1' is obtained, an updated ratio R' may be calculated based on the updated first parameter P1' and the second parameter P2. In a similar way, when an updated second parameter P2' is obtained, an updated ratio R' may be calculated based on the first parameter P1 and the updated second parameter P2'. Furthermore, when an updated first parameter P1' and an updated second parameter P2' are obtained, an updated ratio R' may be calculated based on the first updated parameter P1' and the second updated parameter P2'. The updated ratio R' may in turn be used to determine the value of the radio link failure timer T. Hence, the client device 100 may determine the value of the radio link failure timer T based on an updated ratio R', where the updated ratio R' may be based on the updated first parameter P1' and the second parameter P2, the first parameter P1 and the updated second parameter P2', or the first updated parameter P1' and the second updated parameter P2'. Thereby, the value of the radio link failure timer T can be continuously adapted to changing radio link quality e.g. due to movement and/or beam blocking.

Furthermore, where the ratio R is the first parameter P1 over the second parameter P2, an increase in the ratio R typically indicates improved radio link quality. The client device 100 may hence increase the value of the radio link failure timer T with a first amount if the updated ratio R' is larger than the ratio R. An increase of the value of the radio link failure timer T makes it less likely that a radio link failure will be declared, as more time is available to perform lower layer beam management/beam failure recovery operations. A decrease in the ratio R on the other hand typically indicates deteriorating radio link quality. The client device 100 may hence decrease the value of the radio link failure timer T with a second amount if the updated ratio R' is smaller than the ratio R. A decrease of the value of the radio link failure timer T makes it more likely that a radio link failure will be declared and thereby that higher layer radio link re-establishment operation will be initiated.

In order to avoid updating the value of the radio link failure timer T for small changes in the ratio R, a threshold value may be used. In this case, the client device 100 may hence increase the value of the radio link failure timer T with the first amount if the updated ratio R' is larger than the ratio R and a first threshold value; and correspondingly decrease the value of the radio link failure timer T with the second amount if the updated ratio R' is smaller than the ratio R and a second threshold value. The first amount may correspond to a first step value S1, e.g. be equal to the first step value S1, such that the value of the radio link failure timer T may be increased in steps. In this case, the client device 100 increases the value of the radio link failure timer T with the first amount which equals to the first step value S1 if the updated ratio R' is larger than the ratio R. In a similar way, the second amount may correspond to a second step value S2, e.g. be equal to the second step value S2, such that the value of the radio link failure timer T may be decreased in steps. In this case, the client device 100 decreases the value of the radio link failure timer T with the second amount which equals to a second step value S2 if the updated ratio R' is smaller than the ratio R. The first step value S and second step value S2 may e.g. be pre-configured or determined in the client device 100. Alternatively, the first step value S1 and second step value S2 may be received from the network access node 300, as will be described below with reference to FIG. 7.

In an embodiment, the value of the radio link failure timer T may be limited, such that the value of the radio link failure timer T is always lower than a maximum value and/or higher than a minimum value. This will put a limit to the possible values of the value of the radio link failure timer T. The maximum and minimum values could be predefined or defined and signalled by the network access node to the client device.

In a further embodiment the value of the radio link failure timer T may be increased according a list of predefined values, such that when the updated ratio R' is larger than the (previous) ratio R the client device 100 increases the value of the radio link failure timer T to a higher value in the predefined list. The number of steps in the predefined list of values that the client device 100 shall take may be determined based on the difference between the updated ratio R' and the ratio R, or it can be predefined.

Figure 6:
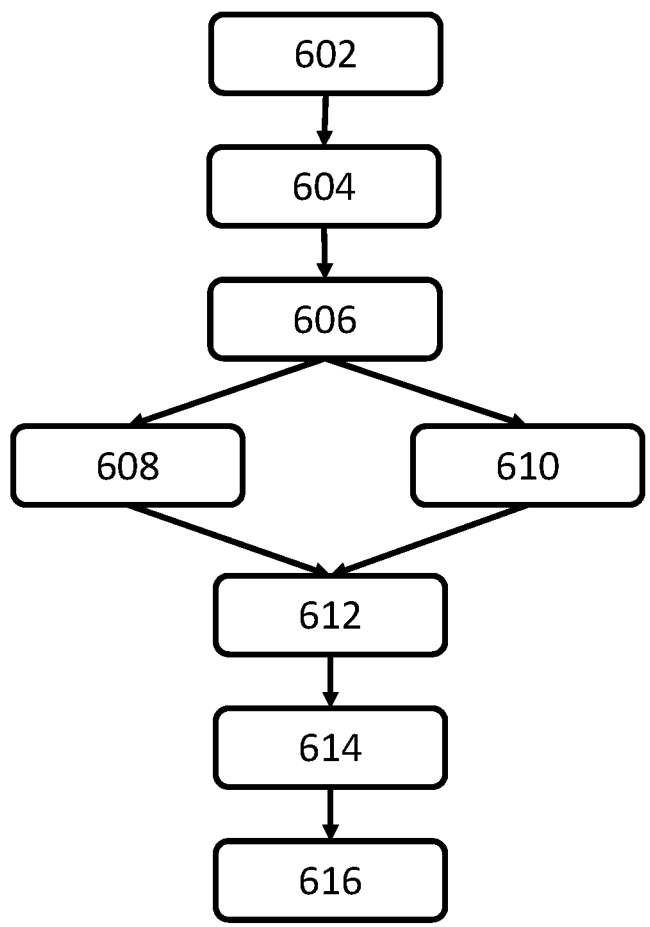
FIG. 6 shows a flow chart of a method according to an embodiment of the invention.

FIG. 6 shows a flow chart of a method 600 according to an embodiment of the invention. The method 600 may be performed in a client device, such as e.g. the client device 100 shown in FIG. 1. The method 600 starts in step 602, where the client device 100 obtains an updated first parameter P1', an updated second parameter P2', or an updated first parameter P1' and an updated second parameter P2'. As previously described, the first parameter P1 may be updated when the radio link failure timer T is started and the second parameter P2 may be updated when the radio link failure timer T is reset. Based on the obtained updated first parameter P1', updated second parameter P2', or updated first parameter P1' and an updated second parameter P2', the client device 100 calculates an updated ratio R', in step 604. In the embodiment shown in FIG. 6, the updated ratio R' is calculated based on the (updated) first parameter P1' over the (updated) second parameter P2. The updated ratio R' calculated in step 604 is further compared in step 606 with a previously calculated ratio R. If the updated ratio R' is larger than the ratio R, step 608 is performed. In step 608, the value of the radio link failure timer T is increased with a first step value S1. On the other hand, if the updated ratio R' is smaller than the ratio R, step 610 is performed. In step 610, the value of the radio link failure timer T is decreased with a second step value S2. In step 612, which is performed when the client device 100 starts the radio link failure timer T, the client device 100 starts the radio link failure timer T with the increased value of radio link failure timer T from step 608 or with the decreased value of radio link failure timer T from step 610. The client device 100 monitors the radio link failure timer T in step 614 and declares a radio link failure if the radio link failure timer expires in step 616.

Figure 7:
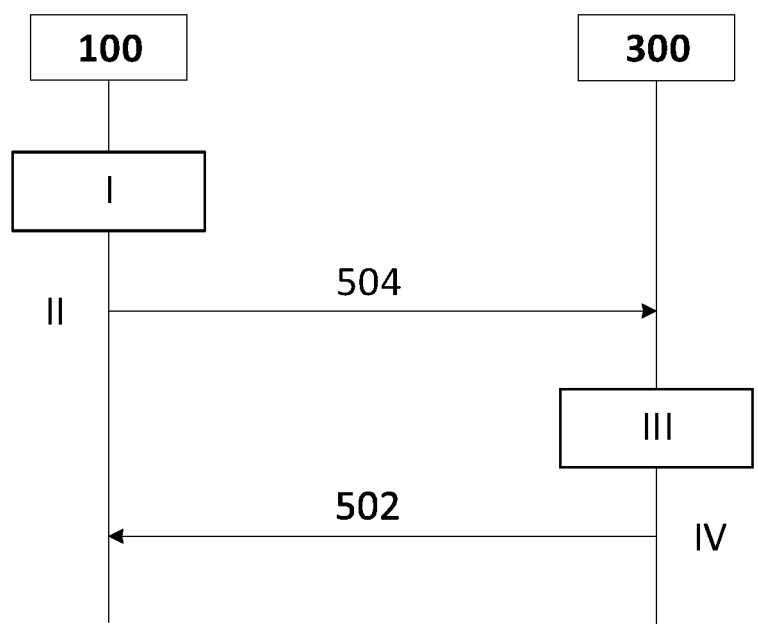
FIG. 7 shows signalling between a client device and a network access node according to an embodiment of the invention.

FIG. 7 shows signalling between the client device 100 and the network access node 300 according to an embodiment of the invention. To help the network access node 300 serving the client device 100 to determine the radio link quality experience by the client device 100, the client device 100 may inform the network access node 300 about the current value of the radio link failure timer T in a second control message 504. In step I in FIG. 7, the client device 100 generates such a second control message 504 indicating the value of the radio link failure timer T. The client device 100 may have determined the value of the radio link failure timer T using any of the previously described approaches. The second control message 504 may further indicate a spatial location. The spatial location is associated with the value of the radio link failure timer T and determined by the client device 1X). In this way, the network access node 300 receives information which associates the value of the radio link failure timer T with a location of the client device 100. The spatial location of the client device 100 may be used by the network access node 300 to increase the knowledge of the network access node 300 about the radio environment in the area where the network access node 300 provides service, such as coverage holes or locations with large variation in signal quality can be detected. In step II FIG. 7, the client device 100 transmits the second control message 504 to the network access node 300 serving the client device 100. The network access node 300 receives the second control message 504 from the client device 100, where the second control message 504 indicates the value of a radio link failure timer T of the client device 100. Thereby, the network access node 300 obtains the value of a radio link failure timer T of the client device 100. In embodiments, the network access node 300 uses the obtained value of the radio link failure timer T to determine a first step value S1 and a second step value S2 associated with the radio link failure timer T. Such a procedure is shown in step III and step IV in FIG. 7, and may be used to allow the network access node 300 to support the client device 100 in the configuration and adaptation of the value of a radio link failure timer T. In step III in FIG. 7, the network access node 300 generates a first control message 502 indicating the first step value S1 and the second step value S2, and in step IV the network access node 300 transmits the first control message 502 to the client device 100. The client device 100 receives the first control message 502 from the network access node 300 serving the client device 100, where the first control message 502 indicates the first step value S1 and the second step value S2. Thereby, the client device 100 obtains the first step value S1 and the second step value S2 and may use the first step value S and the second step value S2 when increasing and decreasing, respectively, the value of a radio link failure timer T, as previously described.

The client device 100 herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g. a Radio Base Station (RBS), which in some networks may be referred to as transmitter, "eNB", "eNodeB". "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of for example, functions, means, units, elements for performing the present solution. Examples of other such means, units, elements, and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A client device, comprising:
at least one processor; and
a non-transitory computer-readable storage medium coupled to the at least one processor and storing programming instructions for execution by the at least one processor, wherein the programming instructions cause the at least one processor to:
obtain a first parameter associated with a radio link failure timer, wherein the first parameter indicates a first time period during which the radio link failure timer is reset and thereafter started;
obtain a second parameter associated with the radio link failure timer, wherein the second parameter indicates a second time period during which the radio link failure timer is started and thereafter reset;
determine a value of the radio link failure timer based on a ratio of the first parameter and the second parameter;
generate a control message indicating the value of the radio link failure timer; and
transmit the control message to a network access node serving the client device.

2. The client device according to claim 1, wherein the programming instructions cause the at least one processor to:
update the first parameter if the radio link failure timer is started to obtain an updated first parameter; and
determine the value of the radio link failure timer based on an updated ratio of the updated first parameter and the second parameter.

3. The client device according to claim 2, wherein the programming instructions cause the at least one processor to:
increase the value of the radio link failure timer with a first amount if the updated ratio is larger than the ratio; and
decrease the value of the radio link failure timer with a second amount if the updated ratio is smaller than the ratio.

4. The client device according to claim 3, wherein the programming instructions cause the at least one processor to:
increase the value of the radio link failure timer with the first amount if the updated ratio is larger than the ratio and a first threshold value; and
decrease the value of the radio link failure timer with the first amount if the updated ratio is smaller than the ratio and a second threshold value.

5. The client device according to claim 4, wherein the programming instructions cause the at least one processor to:
increase the value of the radio link failure timer with the first amount which equals to a first step value; and
decrease the value of the radio link failure timer with the second amount which equals to a second step value.

6. The client device according to claim 5, wherein the programming instructions cause the at least one processor to:
receive message the first step value and the second step value from a network access node serving the client device.

7. The client device according to claim 1, wherein the programming instructions cause the at least one processor to:
update the second parameter if the radio link failure timer is reset to obtain an updated second parameter; and
determine the value of the radio link failure timer based on an updated ratio of the first parameter and the updated second parameter.

8. The client device according to claim 7, wherein the programming instructions cause the at least one processor to:
increase the value of the radio link failure timer with a first amount if the updated ratio is larger than the ratio; and
decrease the value of the radio link failure timer with a second amount if the updated ratio is smaller than the ratio.

9. The client device according to claim 1, wherein the programming instructions cause the at least one processor to:
update the first parameter if the radio link failure timer is started to obtain an updated first parameter;
update the second parameter if the radio link failure timer is reset to obtain an updated second parameter; and
determine the value of the radio link failure timer based on an updated ratio of the first updated parameter and the second updated parameter.

10. The client device according to claim 9, wherein the programming instructions cause the at least one processor to:

increase the value of the radio link failure timer with a first amount if the updated ratio is larger than the ratio; and decrease the value of the radio link failure timer with a second amount if the updated ratio is smaller than the ratio.

11. The client device according to claim 1, wherein the programming instructions cause the at least one processor to:

determine a spatial location associated with the value of the radio link failure timer; and wherein the control message indicates the spatial location.

12. The client device according to claim 1, wherein the programming instructions cause the at least one processor to:

declare a radio link failure if the radio link failure timer expires.

13. A computer-implemented method, comprising:

obtaining a first parameter associated with a radio link failure timer, wherein the first parameter indicates a first time period during which the radio link failure timer is reset and thereafter started;

obtaining a second parameter associated with the radio link failure timer, wherein the second parameter indicates a second time period during which the radio link failure timer is started and thereafter reset;

determining a value of the radio link failure timer based on a ratio of the first parameter and the second parameter;

generating a control message indicating the value of the radio link failure timer; and transmitting, by a client device, the control message to a network access node serving the client device.

14. The method according to claim 13, comprising:

update the first parameter if the radio link failure timer is started to obtain an updated first parameter; and determine the value of the radio link failure timer based on an updated ratio of the updated first parameter and the second parameter.

15. A non-transitory, computer-readable storage medium storing one or more instructions executable by a client device to perform operations comprising:

obtaining a first parameter associated with a radio link failure timer, wherein the first parameter indicates a first time period during which the radio link failure timer is reset and thereafter started;

obtaining a second parameter associated with the radio link failure timer, wherein the second parameter indicates a second time period during which the radio link failure timer is started and thereafter reset; and determining a value of the radio link failure timer based on a ratio of the first parameter and the second parameter; wherein the operation further comprising:

generating a control message indicating the value of the radio link failure timer; and transmitting the control message to a network access node serving the client device.

* * * * *

UNITED STATES PATENT AND TRADEMARK OFFICE
CERTIFICATE OF CORRECTION

PATENT NO. : 11,539,478 B2
APPLICATION NO. : 16/905322
DATED : December 27, 2022
INVENTOR(S) : Tao Cai et al.

It is certified that error appears in the above-identified patent and that said Letters Patent is hereby corrected as shown below:

In the Claims

In Column 14, Line 35, In Claim 6, after "receive" delete "message".

Signed and Sealed this
Twelfth Day of March, 2024

Katherine Kelly Vidal
*Director of the United States Patent and Trademark Office*